United States Patent
Lee et al.

(10) Patent No.: US 7,864,726 B2
(45) Date of Patent: Jan. 4, 2011

(54) ESTABLISHMENT OF RADIO RESOURCE CONTROL CONNECTION IN WIRELESS COMMUNICATION SYSTEM

(75) Inventors: Young Dae Lee, Kyoungki-do (KR); Sung-Duck Chun, Anyang (KR)

(73) Assignee: LG Electronics Inc., Seoul (KR)

( * ) Notice: Subject to any disclaimer, the term of this patent is extended or adjusted under 35 U.S.C. 154(b) by 279 days.

(21) Appl. No.: 11/202,582

(22) Filed: Aug. 11, 2005

(65) Prior Publication Data

US 2006/0034204 A1 Feb. 16, 2006

Related U.S. Application Data

(60) Provisional application No. 60/601,128, filed on Aug. 13, 2004.

(30) Foreign Application Priority Data

Aug. 13, 2004 (KR) .......................... 2004-0063691

(51) Int. Cl.
*H04W 4/00* (2009.01)
(52) U.S. Cl. .................................... 370/328; 455/432.1
(58) Field of Classification Search ................. 370/328, 370/335, 331; 455/432.1, 432.2, 436–444
See application file for complete search history.

(56) References Cited

U.S. PATENT DOCUMENTS

| | | | | |
|---|---|---|---|---|
| 6,917,807 | B1* | 7/2005 | Vialen et al. | 455/435.2 |
| 7,194,277 | B2* | 3/2007 | Farnsworth | 455/458 |
| 2004/0081192 | A1* | 4/2004 | Koulakiotis et al. | 370/432 |
| 2004/0085926 | A1* | 5/2004 | Hwang et al. | 370/328 |
| 2004/0147266 | A1* | 7/2004 | Hwang et al. | 455/445 |
| 2005/0111393 | A1 | 5/2005 | Jeong et al. | |
| 2006/0106865 | A1* | 5/2006 | Beming et al. | 707/104.1 |
| 2006/0258384 | A1* | 11/2006 | Edwin et al. | 455/503 |

FOREIGN PATENT DOCUMENTS

EP 1 439 668 A 7/2004

(Continued)

OTHER PUBLICATIONS

3GPP, TS 22.146 V6.2.0 (Mar. 2003).*

(Continued)

*Primary Examiner*—Lester Kincaid
*Assistant Examiner*—Steven Lim
(74) *Attorney, Agent, or Firm*—Lee, Hong, Degerman, Kang & Waimey

(57) ABSTRACT

A method for controlling a user equipment (UE) having at least an upper layer which is above a radio resource control (RRC) layer, wherein the UE is capable of receiving a point-to-multipoint service and performing cell reselection in a wireless communication system comprises receiving an establishment parameter from the upper layer. The method also includes transmitting an RRC connection request to a network, and determining, in the RRC layer upon the cell reselection, whether to continue an RRC connection procedure to the network based on the establishment parameter. The method also includes terminating the RRC connection procedure to the network based on a result of the determining step. The RRC connection procedure may be terminated if the establishment parameter indicates a point-to-multipoint service reception.

6 Claims, 5 Drawing Sheets

FOREIGN PATENT DOCUMENTS

| | | |
|---|---|---|
| JP | 2004040770 | 2/2004 |
| JP | 2004187279 | 7/2004 |
| JP | 2004221760 | 8/2004 |
| KR | 10-2003-00064263 | 7/2003 |
| KR | 10-2003-00090519 | 11/2003 |
| RU | 2147796 | 4/2000 |
| RU | 2289890 | 12/2006 |
| RU | 2304363 | 8/2007 |
| WO | 03096728 | 11/2003 |
| WO | 2004/017540 | 2/2004 |
| WO | 2004017541 | 2/2004 |
| WO | 2004043107 | 5/2004 |
| WO | WO 2004/064342 A | 7/2004 |

OTHER PUBLICATIONS

3GPP TS 25.346 V2.1.0 (Jun. 2003).*
3GPP, ETSI TS 125 331 V5.5.0 (Jun. 2003).*
3GPP, ETSI TS 125 301 V5.2.0 (Sep. 2002).*
3GPP, ETSI TS 125 331 V5.5.0 (Jun. 2003), pp. 67-71.*

* cited by examiner

ESTABLISHMENT OF RADIO RESOURCE CONTROL CONNECTION IN WIRELESS COMMUNICATION SYSTEM

CROSS-REFERENCE TO RELATED APPLICATIONS

Pursuant to 35 U.S.C. §119, this application claims the benefit of earlier filing date and right of priority to U.S. Provisional Application No. 60/601,128, filed on Aug. 13, 2004, and Korean Application No. 2004-0063691, filed on Aug. 13, 2004, the contents of which are hereby incorporated by reference herein in their entirety.

FIELD OF THE INVENTION

The present invention relates generally to a wireless communication system and, more particularly, to radio resource control in a wireless communication system.

BACKGROUND OF THE INVENTION

FIG. 1 is a block diagram illustrating a UMTS (universal mobile telecommunications system) network structure.

Referring to FIG. 1, the UMTS system includes a terminal (user equipment (UE)), a UMTS terrestrial radio access network (UTRAN) and a core network (CN). The UTRAN includes at least one radio network sub-system (RNS). Each RNS includes one radio network controller (RNC) and at least one base station (e.g., node-B) managed by the RNC. At least one cell exists for each node-B.

FIG. 2 is a diagram illustrating a radio interface protocol architecture between a terminal and a UTRAN. As such, FIG. 2 depicts a radio interface protocol architecture based upon a 3GPP (third generation partnership project) radio access network specification between the terminal and the UTRAN.

Referring to FIG. 2, the radio interface protocol is horizontally arranged to include a physical layer, a data link layer, and a network layer. Furthermore, the radio interface protocol is vertically divided into a user plane for data information transfer and a control plane for signaling transfer. The protocol layers may also be divided into an L1 (first layer), an L2 (second layer) and an L3 (third layer) based upon the lower three layers of an open system interconnection (OSI) model.

The first layer or physical layer provides an upper layer with an information transfer service using a physical channel. The physical layer is connected to an upper layer called a medium access control (MAC) layer through a transport channel. Data is transferred between the MAC layer and the physical layer through the transport channel. Data is also transferred between different physical layers, i.e. between physical layers of a transmitting side and a receiving side, through the physical channel.

The MAC layer of the second layer provides an upper layer called a radio link control layer with a service through a logical channel. A radio link control (RLC) layer of the second layer supports reliable data transfer and performs segmentation and concatenation of a service data unit (SDU) received from an upper layer.

A radio resource control (RRC) layer at a lower portion of the L3 layer is defined in the control plane and controls logical channels, transport channels, and physical channels for configuration, re-configuration and release of radio bearers (RBs). A RB is a service provided by the second layer for data transfer between the terminal and the UTRAN. The configuration of the RBs includes defining characteristics of protocol layers and channels required to provide a specific service, and configuring respective specific parameters and operation methods. When the RRC layer of a terminal and the RRC layer of a UTRAN are connected to communicate RRC messages, the terminal is in an RRC connected state. However, if the RRC layer of the terminal and the RRC layer of the UTRAN are not connected, the terminal is in an idle state.

An upper layer of the RRC of the terminal commands the start of an RRC connection procedure. That is, the RRC of the terminal does not arbitrarily start the RRC connection procedure. Rather, the RRC of the terminal starts the RRC connection procedure upon receiving a command given from the upper layer of the RRC. The upper layer of the RRC notifies the RRC of the cause of the RRC connection using an establishment cause value.

An RRC state of the terminal and an RRC connection method are described below.

The RRC state indicates whether or not the RRC of the terminal has a logical connection with the RRC of the UTRAN. If the connection is made, the RRC state is an RRC connected state. However, if the connection is not made, the RRC state is an RRC idle state. When the terminal is in the RRC connected state, the UTRAN may recognize (e.g., may count) the existence of terminals within a cell, in order to control the terminal. However, when the terminal is in the idle state, the UTRAN may not recognize the terminal. Therefore, a core network manages the terminal within a location area or routing area unit. The location area or routing area unit is wider than the cell. The existence of the terminal in the idle state may only be recognized wider area unit, such as a location area or routing area unit. The terminal should therefore enter a connected state in order to receive general mobile communications services, such as voice or data.

When a user initially turns on the terminal, the terminal searches an appropriate cell and then remains in the idle state in the corresponding cell. When RRC connection is required, the terminal in the idle state transitions to an RRC connected state by establishing an RRC connection with an RRC of the UTRAN. The terminal in the idle state requires the RRC connection in cases such as uplink data transfer due to a user's attempt to make a phone call, or transfer of a response message with respect to a paging message received from the UTRAN.

As mentioned above, the terminal in the idle state performs an RRC connection procedure to establish an RRC connection with the UTRAN. The RRC connection procedure includes three steps of: sending an RRC connection request message from the terminal to the UTRAN, sending an RRC connection setup message from the UTRAN to the terminal, and sending an RRC connection setup complete message from the terminal to the UTRAN.

FIG. 3 is a diagram illustrating RRC connection between a terminal and the UTRAN.

Referring to FIG. 3, to establish an RRC connection for a calling attempt or a response to paging from the UTRAN, the terminal in the idle state sends an RRC connection request message to the UTRAN (S10, S11). The RRC connection request message includes an initial UE identity of the terminal and an RRC establishment cause. The initial UE identity is an inherent identity of the terminal which allows the terminal to be identified. The terminal sends the RRC connection request message and also drives a timer. If the terminal does not receive an RRC connection setup message or an RRC connection rejection message before the timer expires, then the terminal re-sends the RRC connection request message. The maximum number of times that the RRC connection request message is sent is limited to a set value.

Upon receiving the RRC connection request message from the terminal, the UTRAN accepts the RRC connection request of the terminal, as long as radio resources are sufficient, and sends an RRC connection setup message (e.g., a response message) to the terminal (S12). The RRC connection setup message includes an initial UE identity, a radio network temporary identity (RNTI), and radio bearer setup information. The radio network temporary identity (RNTI) is an identity of a terminal. The RNTI is assigned to identify a terminal in a connected state and is used when the RRC connection exists. The RNTI is used within the UTRAN.

After the RRC connection is established, the terminal communicates with the UTRAN using the RNTI instead of the initial UE identity. The initial UE identity is an inherent identity of the terminal and therefore is used by the terminal in the RRC connection procedure, instead of the RNTI, for security purposes.

Upon receiving the RRC connection setup message from the UTRAN, the terminal compares its own identity against the initial UE identity included in the RRC connection setup message to check whether the received message is for the terminal. If the check shows that the message is for the terminal, the terminal stores the RNTI assigned by the UTRAN and sends an RRC connection setup complete message to the UTRAN (S13). The RRC connection setup complete message includes performance information related to the terminal. If the terminal succeeds in sending the RRC connection setup message, the terminal establishes an RRC connection with the UTRAN and transitions to an RRC connected state (S14, S15).

The RRC connection procedure described with respect to FIG. 3 is performed upon the UTRAN's acceptance of the RRC connection request. However, if radio resources are not sufficient, the UTRAN may reject the RRC connection request. This scenario is described further below with respect to FIG. 4.

FIG. 4 is a diagram illustrating RRC connection rejection by the UTRAN.

Referring to FIG. 4, the terminal in the idle state sends an RRC connection request message to the UTRAN (S20, S21). Upon receiving the RRC connection request message, the UTRAN sends an RRC connection rejection message to the terminal, if necessary (S22). When the UTRAN sends an RRC connection rejection message to the terminal, including an initial UE identity and a rejection cause in order to notify the terminal of the reason why the RRC connection request has been rejected. The terminal receives the RRC connection rejection message and checks whether the message is for the terminal via the initial UE identity. If the RRC connection rejection message is for the terminal, then the terminal stops attempting RRC connection. However, if the initial UE identity included in the RRC connection rejection message is different from the initial UE identity of the terminal (e.g., the message is not for the terminal), the terminal discards the message and continues to wait for reception of an RRC connection setup message or an RRC connection rejection message.

Since terminals move from place to place, the UTRAN performs a counting procedure related to movement of the terminal. The movement of the terminal is considered in a situation where the terminal has sent an RRC connection request message and then moves to another cell before receiving a response from the UTRAN. Furthermore, the movement of the terminal is considered in a situation where the terminal has received an RRC connection setup message from the UTRAN and then moves to another cell before sending an RRC connection setup complete message.

In the first situation of where the terminal has sent an RRC connection request message and then moves to another cell before receiving a response from the UTRAN, the UTRAN may send a response message to the terminal. However, the response message is sent within the cell where the terminal sent the RRC connection request message. Therefore, the terminal may not receive any response from the UTRAN after the terminal has moved to another cell. Therefore, unless other actions are performed, the terminal may not establish any RRC connection in a new cell. Thus, having moved to another cell before receiving an RRC connection setup message, the terminal should construct a new RRC connection request message and send the newly constructed message to the UTRAN.

In the second situation where the terminal has received an RRC connection setup message from the UTRAN and then moves to another cell before sending an RRC connection setup complete message, because the UTRAN does not receive a response from the terminal regarding establishment of an RRC connection, the UTRAN may not complete information related to the terminal and environment configuration. Furthermore, upon determining that the terminal stays in the first cell, the UTRAN manages radio resources for the terminal within the first cell. Accordingly, unless other actions are performed within a cell to which the terminal has newly moved, the terminal may not establish an RRC connection. Therefore, the terminal should construct a new RRC connection request message and send the newly constructed message to the UTRAN.

FIG. 5 is a flow diagram illustrating an RRC connection establishment procedure by the terminal during cell reselection.

Referring to FIG. 5, to establish an RRC connection, the terminal in an idle state sends an RRC connection request message to the UTRAN (S30).

The terminal checks whether re-selection of a cell occurs while waiting for the reception of an RRC connection setup message from the UTRAN (S31, S32). If the re-selection of the cell occurs, the terminal compares a V300 value to an N300 value (S45). If the V300 value does not exceed the N300 value, the terminal sends an RRC connection request message to the UTRAN and then performs operations related to step S31. If the V300 value is greater than the N300 value, the RRC connection establishment procedure is completed. The terminal then increases a V300 value by 1 and then re-operates a T300.

In contrast, when receiving the RRC connection setup message from the UTRAN, the terminal begins configuration of a radio environment according to contents of the corresponding message and stops the T300. Once the radio environment configuration is completed, the terminal sends an RRC connection setup complete message and completes the procedure. However, if cell re-selection occurs before the RRC connection setup complete message is sent to the UTRAN (S35, S36), the terminal compares a V300 value to an N300 value (S34).

If the comparison result shows that the V300 value does not exceed the N300 value, the terminal re-sends an RRC connection request message to the UTRAN and then performs the operations from step S31. If the V300 value is greater than the N300 value, the terminal completes the RRC connection establishment procedure.

The V300 is a value for managing the number of times that the terminal sends an RRC connection setup message in the current RRC connection establishment procedure. The terminal compares the V300 to the N300 to perform management allowing the RRC connection request message to not be sent as frequently as N300. The T300 is a timer used to prevent problems occurring as the terminal indefinitely waits for a response from the UTRAN under circumstances where the UTRAN may not send a response to the terminal. If the terminal does not receive a response from the UTRAN until the T300 expires, the T300 controls of the release of the RRC connection establishment procedure and/or transmission of a new RRC connection setup request message.

A multimedia broadcast/multicast service (MBMS) is described below.

The MBMS refers to a service that provides a plurality of terminals with a streaming or background service, using a downlink-dedicated MBMS bearer service (BS). An MBMS service includes at least one session, and MBMS data is sent to a plurality of terminals through the MBMS bearer service (BS) only while the session is ongoing.

The UTRAN provides the terminal with an MBMS bearer service using a radio bearer (RB). A point-to-point RB is a bi-directional RB and includes a logical channel DTCH (dedicated traffic channel), a transport channel DCH (dedicated channel) and a physical channel DPCH (dedicated physical channel) or a physical channel SCCPCH (secondary common control physical channel). A point-to-multipoint RB is a uni-directional downlink RB and includes a logical channel MTCH (MBMS traffic channel), a transport channel FACH (forward access channel) and a physical channel SCCPCH. The logical channel MTCH is configured for each MBMS service provided to a cell, and is used to send user plane data related to a specific MBMS service to a plurality of terminals.

By using a multicast service notification procedure, the UTRAN performs a counting function to count the number of terminals that intend to receive a specific multicast service within a specific cell. The counting function is used to determine whether an RB providing a specific multicast service is set as point-to-multipoint or to point-to-point. When the number of terminals existing in the corresponding cell is smaller than a threshold value, the UTRAN sets a point-to-point RB. However, when the number of terminals existing in the corresponding cell is greater than the threshold value, the UTRAN sets a point-to-multipoint RB.

When the point-to-point RB is set with respect to a specific service, all the terminals that intend to receive the service enter an RRC connected state. However, if a point-to-multipoint RB is set with respect to a specific service, the terminals that intend to receive that service may not enter an RRC connected state. Furthermore, a terminal in an RRC idle state may receive a multicast service through the point-to-multipoint RB.

In the multicast service, the UTRAN uses a counting function to determine whether to set a point-to-multipoint RB or a point-to-point RB. The selection of a radio bearer type through the counting function may enable efficient use of radio resources. The counting function is performed periodically before the multicast service or during the multicast service. The terminal in the idle state performs an RRC connection establishment procedure with the UTRAN after receiving service notification, such that the UTRAN counts the number of terminals. After the service notification, the UTRAN counts the number of terminals that intend to receive a specific multicast service within a cell upon receiving SGSN (serving GPRS support node) information associated with terminals having an RRC connection. The RB type of a multicast service may thereby be determined.

Once the RB type is determined, the UTRAN performs control such that a certain number of terminals receive a corresponding service in an RRC connected state according to a state of radio resources, and certain other terminals receive the corresponding service in an RRC idle state.

As described above, the UTRAN performs a counting procedure to determine an RB type for a specific MBMS service. In such a counting procedure, a terminal sends an RRC connection request message to the UTRAN to establish an RRC connection and to notify the UTRAN that it wants to receive the specific MBMS service, thereby providing information required by the UTRAN to determine an RB for the specific MBMS service.

The UTRAN determines an RB for a specific service by a cell unit. Accordingly, the UTRAN performs a counting procedure per cell unit, meaning that the UTRAN may not perform the counting procedure according to circumstances and characteristics of a specific cell, and also meaning that when an RB is established for one cell, information from another cell is not necessary.

Also, during an RRC connection request procedure, the terminal continues sending an RRC connection request message to the UTRAN to establish an RRC connection until completing the RRC connection establishment or receiving an RRC connection rejection message.

In one example, it is assumed that cell A is a service area of MBMS service 1 and cell B is not a service area of the MBMS service 1. The service area is a region in which a corresponding service is available. Additionally, it is assumed that the terminal stays in cell A.

Accordingly, when MBMS service 1 begins, cell A performs a counting procedure. Because the terminal staying in cell A wants to receive MBMS service 1, the terminal sends an RRC connection request message to the UTRAN in response to the counting procedure. It is further assumed that the terminal moves to cell B while waiting for the reception of a response message to an RRC connection request from the UTRAN.

According to the related art operation, the terminal once again constructs an RRC connection request message in cell B and sends the message to the UTRAN. However, because cell B is not a service area of MBMS service 1, the terminal may not receive the corresponding MBMS service in cell B.

Nonetheless, the terminal sends an RRC connection request message in cell B where the MBMS service is not available. Accordingly, an uplink common channel may become congested due to unnecessary transmission of RRC connection request messages. Furthermore, if the RRC connection is established, radio resources of cell B may be wasted and the terminal may waste battery power by maintaining an RRC connection longer than necessary.

SUMMARY OF THE INVENTION

Accordingly, the present invention is directed to establishment of a radio resource control (RRC) connection that substantially obviates one or more problems due to limitations and disadvantages of the related art.

An object of the present invention is to allow a terminal to perform an RRC connection in a wireless communication system, when the terminal moves to another cell.

Another object of the present invention is to establish an RRC connection without excessive requests to the wireless communication system for RRC connection.

Another object of the present invention is to establish an RRC connection such that network resources may be conserved.

Another object of the present invention is to establish an RRC connection such that battery power of the terminal may be conserved.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, in one embodiment, a method for controlling a user equipment (UE) having at least an upper layer which is above a radio resource control (RRC) layer, wherein the UE is capable of receiving a point-to-multipoint service and performing cell reselection in a wireless communication system comprises receiving an establishment parameter from the upper layer. The method also includes transmitting an RRC connection request to a network, and determining, in the RRC layer upon the cell reselection, whether to continue an RRC connection procedure to the network based on the establishment parameter. The method also includes terminating the RRC connection procedure to the network based on a result of the determining step.

The RRC connection procedure may be terminated if the establishment parameter indicates a point-to-multipoint service reception. The network may be a UTMS terrestrial radio access network (UTRAN). The method may further comprise completing the RRC connection procedure if the result of the determining step does not require the terminating of the RRC connection procedure.

In another embodiment, a method for controlling a user equipment (UE) capable of receiving a point-to-multipoint service and performing cell reselection in a wireless communication system comprises transmitting an RRC connection request to a network and receiving control information from a network upon cell reselection. The method also comprises determining whether or not to terminate an RRC connection procedure in response to the control information. The method also comprises terminating the RRC connection procedure based on a result of the determining step.

The control information may indicate that the point-to-multipoint radio bearer is established for the point-to-multipoint service. The control information may be transmitted over a common control channel. The common control channel may be a multimedia broadcast/multicast service (MBMS) control channel (MCCH). The common control channel may be a broadcast control channel (BCCH). The control information may indicate a point-to-multipoint service identifier.

The foregoing and other objects, features, aspects and advantages of the present invention will become more apparent from the following detailed description of the present invention when taken in conjunction with the accompanying drawings. It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principles of the invention.

DETAILED DESCRIPTION OF THE PREFERRED EMBODIMENTS

Figure 1:
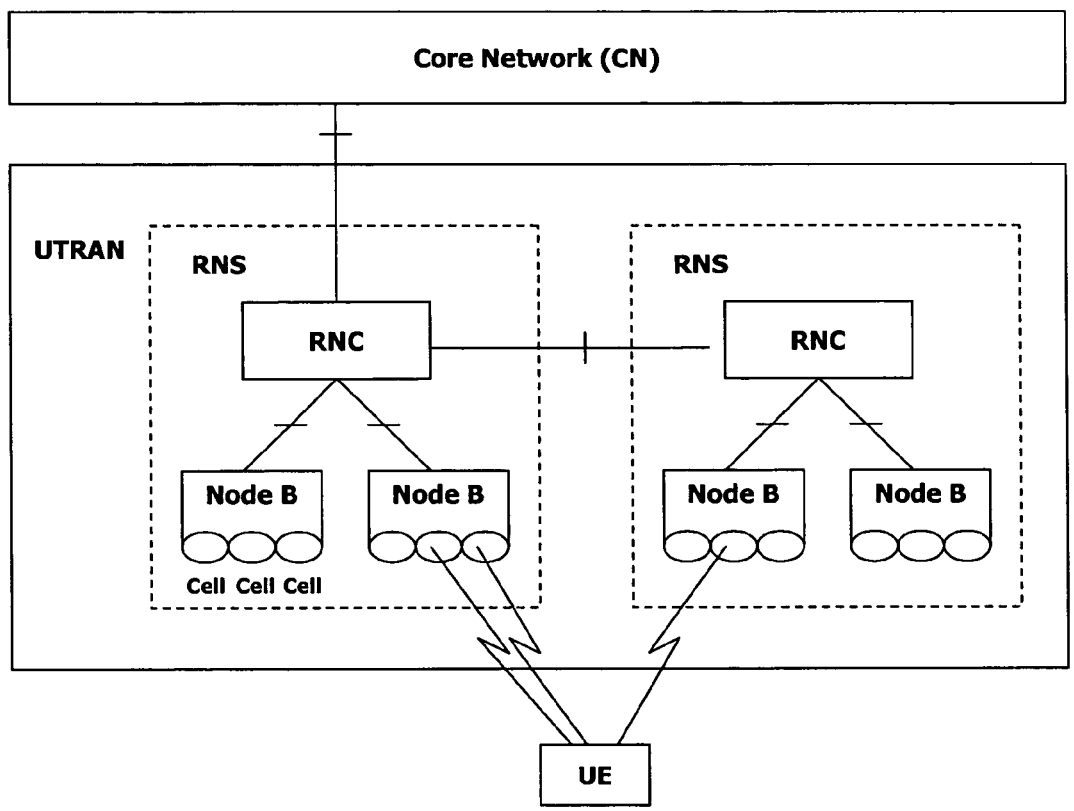
FIG. 1 is a block diagram illustrating a UMTS network structure.
Figure 2:
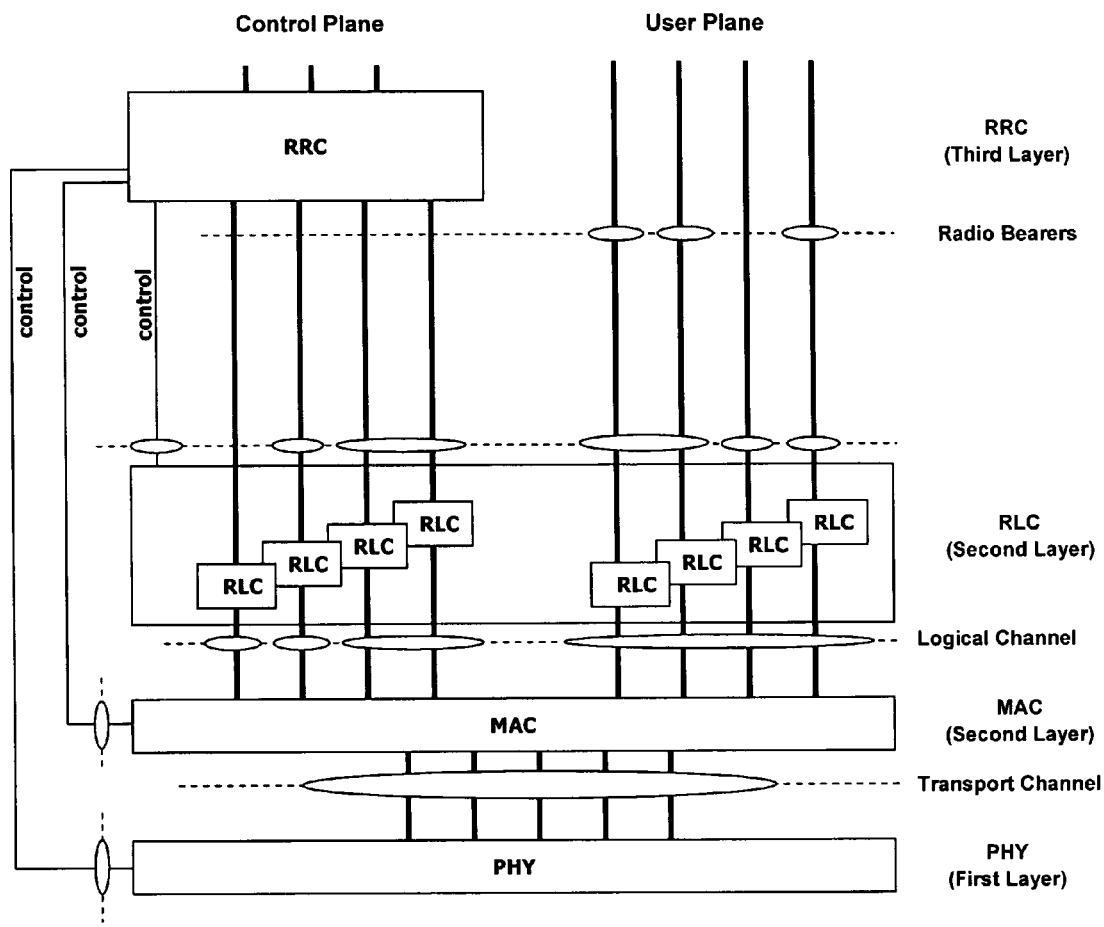
FIG. 2 is a diagram illustrating a radio interface protocol architecture between a terminal and a UTRAN.
Figure 3:
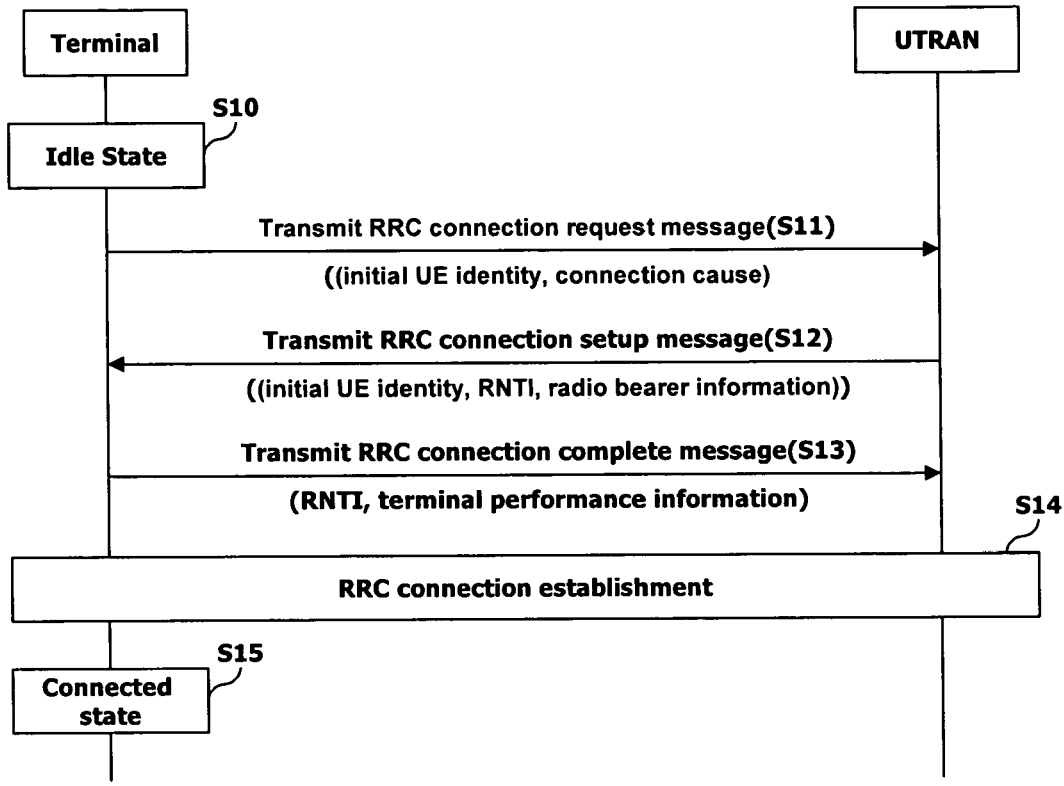
FIG. 3 is a diagram illustrating RRC connection between a terminal and the UTRAN.
Figure 4:
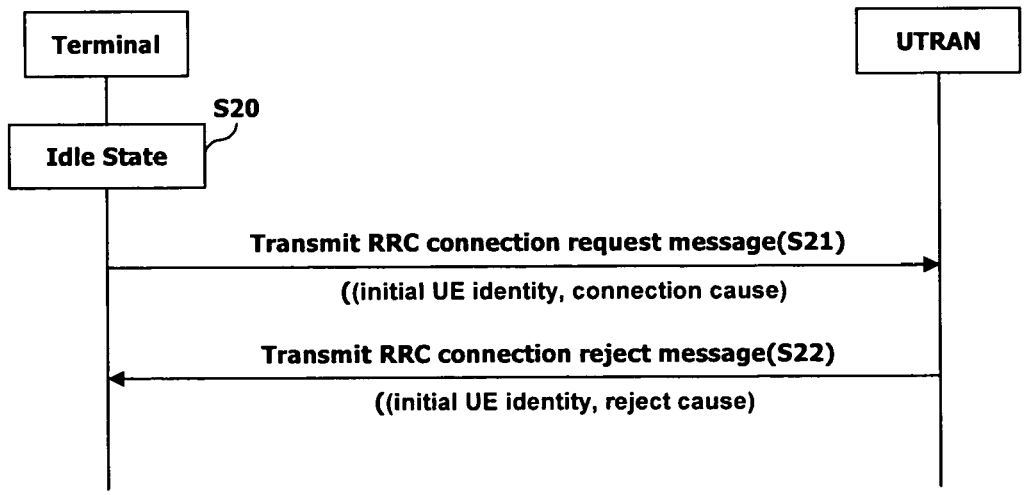
FIG. 4 is a diagram illustrating RRC connection rejection by the UTRAN.
Figure 5:
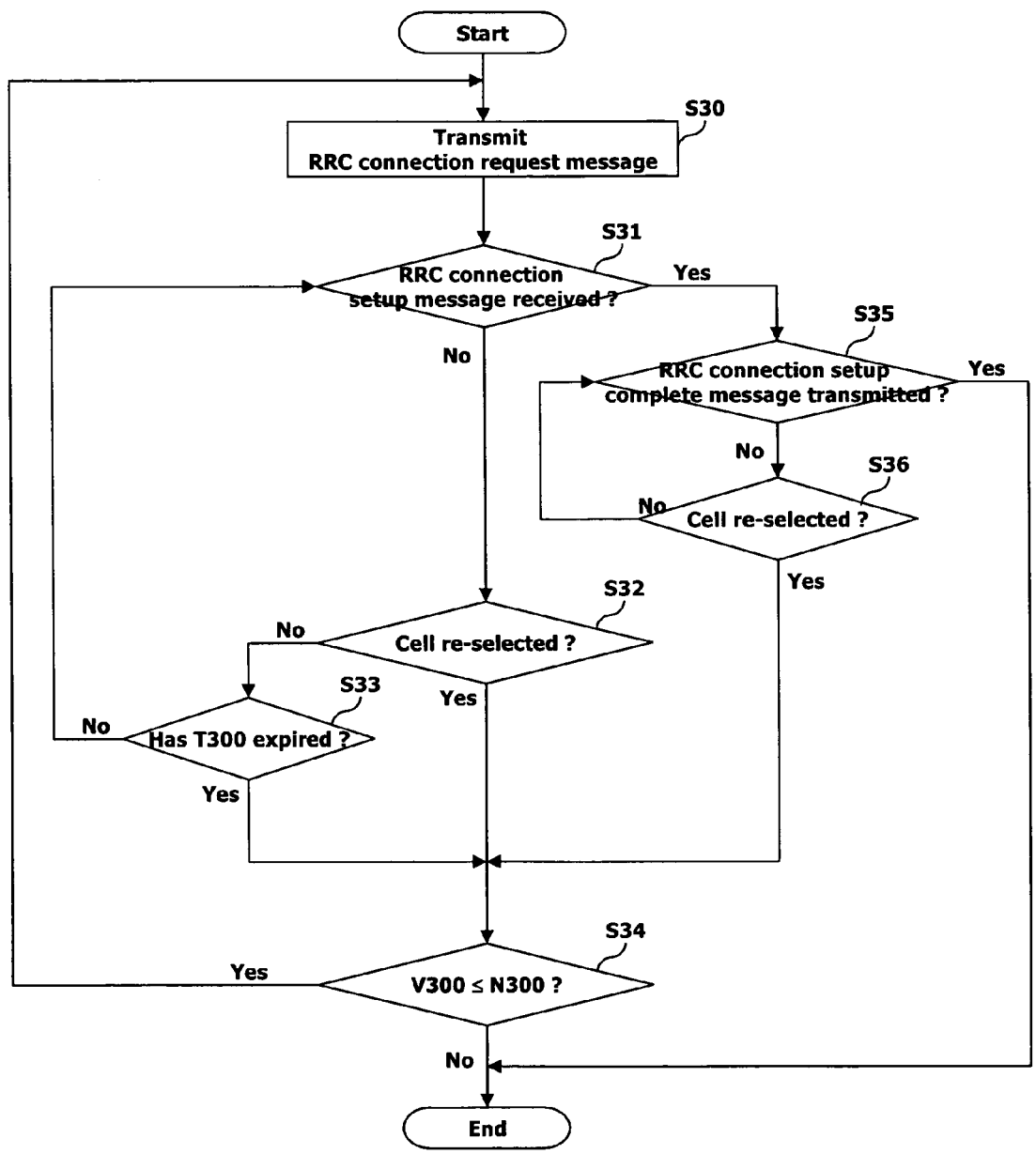
FIG. 5 is a flow diagram illustrating an RRC connection establishment procedure by the terminal during cell reselection.

Reference will now be made in detail to the preferred embodiments of the present invention, examples of which are illustrated in the accompanying drawings. Wherever possible, the same reference numbers will be used throughout the drawings to refer to the same or like parts.

The present invention may be embodied in a mobile communications system such as the UMTS (universal mobile telecommunications system) developed by the 3GPP (third generation partnership project). However, the present invention may also be applied to communications systems operated using other specifications. Furthermore, the point-to-multipoint service referred to herein may be a multimedia broadcast/multicast service (MBMS) or other type of service. Additionally, the terminal referred to herein may be a user equipment (UE) or other type of terminal.

The present invention may allow a terminal to efficiently establish a RRC (radio resource control) connection in a wireless communication system when moving to a different cell. To this end, when the terminal moves from a first cell to a second cell before the RRC connection establishment is completed, the terminal requests an RRC connection from a UTRAN according to control information sent by the UTRAN, in the second cell.

In one embodiment, when the terminal sends an RRC connection request message in the first cell and moves to the second cell before receiving a response message related to the RRC connection request message, from the UTRAN, the terminal determines whether to perform the RRC connection request procedure according to information sent by the UTRAN and then sends an RRC connection request message to the UTRAN, while in the second cell. Alternatively, the terminal releases the RRC connection procedure.

In another embodiment, upon receiving an RRC connection setup message associated with an RRC connection request message from the UTRAN, the terminal moves to the second cell before sending an RRC connection setup complete message to the UTRAN. The terminal then determines whether to perform the RRC connection request procedure according to information sent by the UTRAN, while in the second cell, and then sends an RRC connection request message to the UTRAN. Alternatively, the terminal releases the RRC connection procedure.

The information sent by the UTRAN may preferably include information instructing a terminal which has moved to the second cell before completing an RRC connection establishment procedure that was started in the first cell to release the RRC connection establishment procedure. Furthermore, the information sent by the UTRAN may preferably include an identity of an MBMS service being transmitted (or soon to be transmitted) in the current cell by the UTRAN. Additionally, the information sent by the UTRAN may preferably include a point-to-multipoint radio bearer establishment information related to the MBMS service being transmitted in the current cell by the UTRAN. Also, the information sent by the UTRAN may preferably include information instructing terminals that have subscribed to a MBMS service to respond to the UTRAN. Furthermore, the information sent by the UTRAN may preferably include information to enable the terminal to control a load of an uplink common control channel associated with a MBMS service. The terminal may preferably use the information (e.g., control information) sent by the UTRAN to determine whether to continue an RRC connection request procedure.

In yet another embodiment, the terminal continues the RRC connection establishment procedure if the information sent by the UTRAN instructs the terminal that there is no need to release the RRC connection procedure. Alternatively, the terminal releases the RRC connection procedure.

In still another embodiment, the terminal determines identities of MBMS services that the current cell is transmitting or is soon to transmit, after the terminal has moved to the current cell. The terminal then continues the RRC connection establishment procedure if the determination shows that there is a MBMS service to which the terminal has subscribed. Alternatively, the terminal releases the RRC connection procedure.

In yet another embodiment, the terminal continues the RRC connection establishment procedure in a cell to which the terminal has newly moved if point-to-multipoint radio bearer establishment information of an MBMS service transmitted by the UTRAN in the current cell includes information related to a service to which the terminal has subscribed. Alternatively, the terminal releases the RRC connection procedure.

In still another embodiment, the terminal continues the RRC connection establishment procedure in a cell to which the terminal has newly moved if information instructing terminals that subscribed to a MBMS service to respond to the UTRAN includes a service to which the terminal has subscribed. Alternatively, the terminal releases the RRC connection procedure.

In yet another embodiment, the terminal continues the RRC connection establishment procedure in a cell to which the terminal has newly moved if information to enable the terminal to control a load of an uplink common control channel associated with a specific MBMS service includes information related to a service to which the terminal has subscribed. Alternatively, the terminal releases the RRC connection procedure.

The information sent by the UTRAN may be sent through an MCCH (MBMS control channel) or a BCCH (broadcast control channel). Accordingly, if the BCCH does not contain MCCH establishment information, the terminal releases the RRC connection establishment procedure in the cell to which the terminal has newly moved.

In one embodiment, if the UTRAN provides different services to each cell, or if cells are mutually exclusive because they are managed by different providers, the terminal may release the RRC connection establishment procedure when moving to a new cell, to conserve radio resources. To this end, the UTRAN may prevent terminals that moved from other cells to the current cell from responding to a counting procedure. Accordingly, the UTRAN may transmit an identity to instruct a terminal not to respond through the BCCH or the MCCH.

In another embodiment, in a method for establishing an RRC connection by a terminal, if a terminal sends an RRC connection request message in a first cell and then moves to a second cell before receiving a response message from the UTRAN, the terminal releases the ongoing RRC connection establishment procedure.

In yet another embodiment, if the terminal receives an RRC connection setup message related to the RRC connection request message and moves to another cell before sending an RRC connection setup complete message, the terminal releases the ongoing RRC connection establishment procedure.

In some cases, it is desirable to complete the RRC connection establishment procedure. To this end, the terminal may require information related to when the terminal performs the operations of the aforementioned embodiments. For example, an RRC of the terminal may perform the RRC connection procedure according to one or more embodiments of the present invention when an upper layer of an RRC (upper layer of a terminal) instructs the RRC to release the RRC connection procedure. Alternatively, when the RRC is not instructed by an upper layer for release, the RRC of the terminal may perform a conventional RRC connection procedure.

When the upper layer of the terminal initially instructs the terminal to make an RRC connection, the upper layer of the terminal notifies the RRC of the terminal that the corresponding RRC connection establishment procedure is an RRC connection establishment procedure for an MBMS. For such notification, a new establishment cause value may be used.

Figure 6:
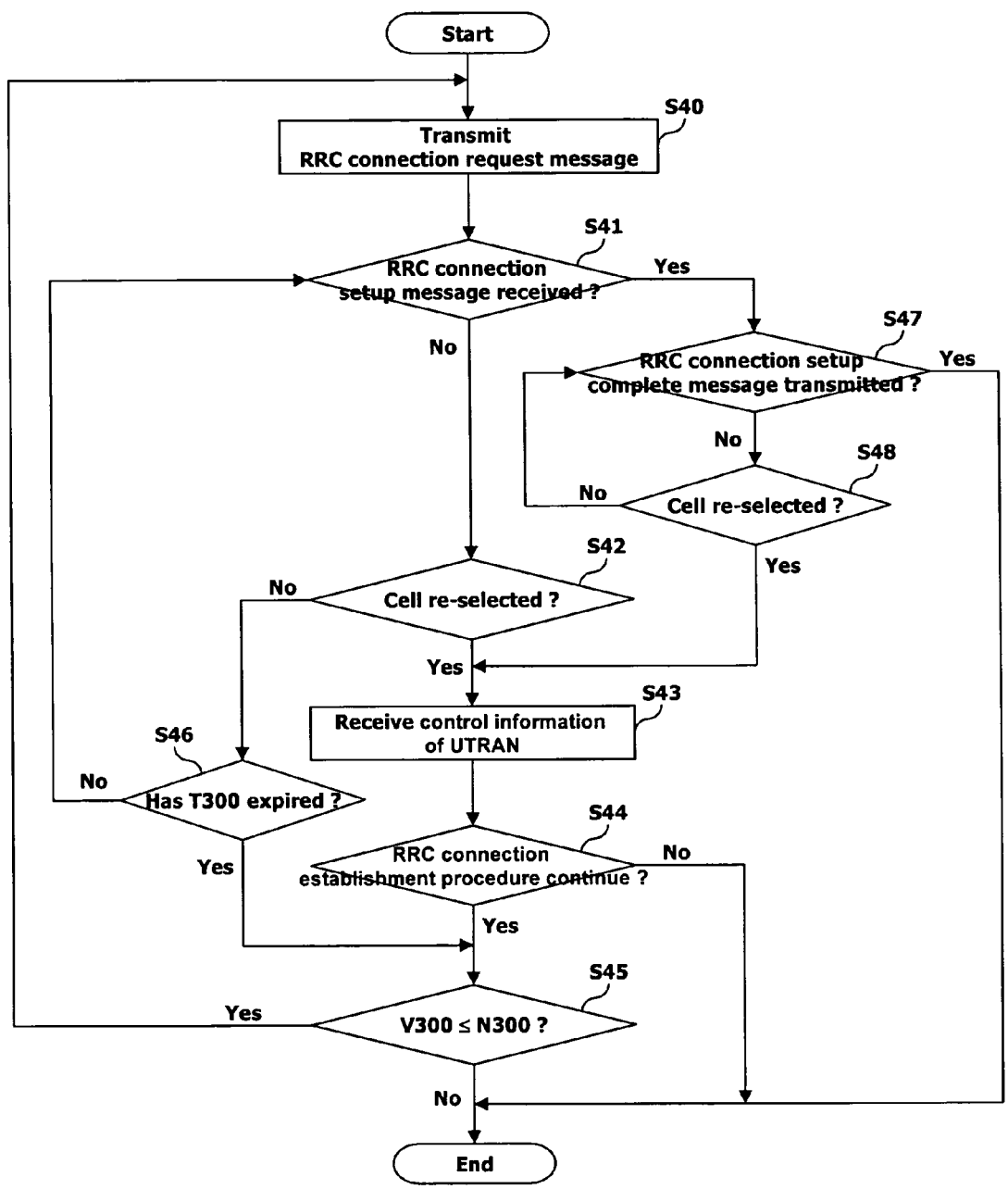
FIG. 6 is a flow diagram illustrating an RRC connection establishment procedure by the terminal during cell reselection, according to an embodiment of the present invention.

FIG. 6 is a flow diagram illustrating an RRC connection establishment procedure by the terminal during cell reselection, according to an embodiment of the present invention.

Referring to FIG. 6, an RRC of a terminal begins an RRC connection establishment procedure when an upper layer requires RRC connection establishment. The RRC of the terminal sends an RRC connection request message to a UTRAN and operates a timer, such as a T300 timer (S40). In such case, a variable, such as a V300 variable, is set to 1.

The terminal then waits for reception of an RRC connection establishment message from the UTRAN (S41). While waiting, the terminal checks whether re-selection of a cell occurs (S42).

When the re-selection of a cell occurs, the terminal receives control information related to the UTRAN within a new cell (S43) and determines whether to continue or release the RRC connection establishment procedure according to the corresponding control information (S44). If the terminal determines to continue the RRC connection establishment procedure, the terminal compares a V300 value to a second value, such as an N300 value (S45). When the V300 value does not exceed the N300 value, the terminal re-sends an RRC connection request message to the UTRAN to perform the operations from the step S41. When the N300 value is greater than the V300 value, the terminal terminates the RRC connection establishment procedure. The terminal then increases the V300 value by 1 and re-operates the T300.

In contrast, if the re-selection of the cell does not occur in the step S42, the terminal checks whether the T300 has expired (S46). If the T300 has expired, the terminal proceeds to the step S45. However, if the T300 has not expired, the terminal proceeds to the step S41.

If an RRC connection setup message is received from the UTRAN in the step S41, the terminal begins configuration of a radio environment according to the content of the corresponding message and stops the T300. Once the configuration of the radio environment is completed, the terminal sends an RRC connection setup complete message and terminates the procedure. If the cell re-selection occurs before the RRC connection setup complete message is sent (S47, S48), the terminal proceeds to the step S43 and receives control information related to the UTRAN in a new cell.

The terminal determines whether to continue or release an RRC connection establishment procedure according to the received control information related to the UTRAN (S44). If the terminal determines to continue the RRC connection establishment procedure, the terminal compares the V300 value to the N300 value (S45). If the V300 value does not exceed the N300 value, the terminal re-sends an RRC connection request message to the UTRAN and performs the operations from the step S41. If the N300 value is greater than the V300 value, the RRC connection establishment procedure is terminated.

In one embodiment, a method for controlling a user equipment (UE) having at least an upper layer which is above a radio resource control (RRC) layer, wherein the UE is capable of receiving a point-to-multipoint service and performing cell reselection in a wireless communication system comprises receiving an establishment parameter from the upper layer. The method also includes transmitting an RRC connection request to a network, and determining, in the RRC layer upon the cell reselection, whether to continue an RRC connection procedure to the network based on the establishment parameter. The method also includes terminating the RRC connection procedure to the network based on a result of the determining step.

The RRC connection procedure may be terminated if the establishment parameter indicates a point-to-multipoint service reception. The network may be a UTMS terrestrial radio access network (UTRAN). The method may further comprise completing the RRC connection procedure if the result of the determining step does not require the terminating of the RRC connection procedure.

In another embodiment, a method for controlling a user equipment (UE) capable of receiving a point-to-multipoint service and performing cell reselection in a wireless communication system comprises transmitting an RRC connection request to a network and receiving control information from a network upon cell reselection. The method also comprises determining whether or not to terminate an RRC connection procedure in response to the control information. The method also comprises terminating the RRC connection procedure based on a result of the determining step.

The control information may indicate that the point-to-multipoint radio bearer is established for the point-to-multipoint service. The control information may be transmitted over a common control channel. The common control channel may be a multimedia broadcast/multicast service (MBMS) control channel (MCCH). The common control channel may be a broadcast control channel (BCCH). The control information may indicate a point-to-multipoint service identifier.

In the present invention, when a terminal moves to a new cell while making an RRC connection with a UTRAN, the terminal determines whether the RRC connection is required based on information received from the UTRAN. The terminal then sends an RRC connection request message to the UTRAN, if necessary.

Thus, the present invention may minimize waste of radio resources due to unnecessary transmission of RRC connection request messages to the UTRAN. The present invention may also minimize battery consumption by the terminal.

It will be apparent to those skilled in the art that various modifications and variations may be made in the present invention without departing from the spirit or scope of the inventions. Thus, it is intended that the present invention covers the modifications and variations of this invention provided they come within the scope of the appended claims and their equivalents.

What is claimed is:

1. A method of operation for a user equipment (UE) capable of receiving a multimedia broadcast/multicast service (MBMS) service and performing a cell reselection in a wireless communication system, the method comprising:
   receiving an establishment cause from an upper layer, the upper layer being implemented above a radio resource control (RRC) layer;
   transmitting an RRC connection request to an access network with the received establishment cause from the upper layer;
   determining whether to continue or terminate an RRC connection procedure when an RRC connection setup message is not received and the cell reselection occurs; and
   terminating the RRC connection procedure to the access network based on the determining step,
   wherein the establishment cause is used when determining to terminate the RRC connection procedure, and
   wherein the establishment cause is for the MBMS service.

2. The method of claim 1, wherein the establishment cause is a MBMS reception.

3. The method of claim 1, wherein the access network is a UMTS (Universal Mobile Telecommunications System) terrestrial radio access network (UTRAN).

4. A user equipment (UE) capable of receiving a multimedia broadcast/multicast service (MBMS) service and performing a cell reselection in a wireless communication system, the user equipment comprising:
   means for receiving an establishment cause from an upper layer which is above a radio resource control (RRC) layer;
   means for transmitting an RRC connection request to an access network with the received establishment cause from the upper layer;
   means for determining whether to continue or terminate an RRC connection procedure when an RRC connection setup message is not received and the cell reselection occurs; and
   means for terminating the RRC connection procedure to the access network based on the determining step,
   wherein the establishment cause is used when determining to terminate the RRC connection procedure, and
   wherein the establishment cause is for the MBMS service.

5. The user equipment of claim 4, wherein the establishment cause is a MBMS reception.

6. The user equipment of claim 4, wherein the access network is a UMTS (Universal Mobile Telecommunications System) terrestrial radio access network (UTRAN).

* * * * *